Dec. 17, 1940. W. G. LUNDQUIST 2,225,121
SELECTIVE SPEED PROPELLER DRIVE FOR AIRCRAFT ENGINES
Filed Aug. 5, 1938 2 Sheets-Sheet 1
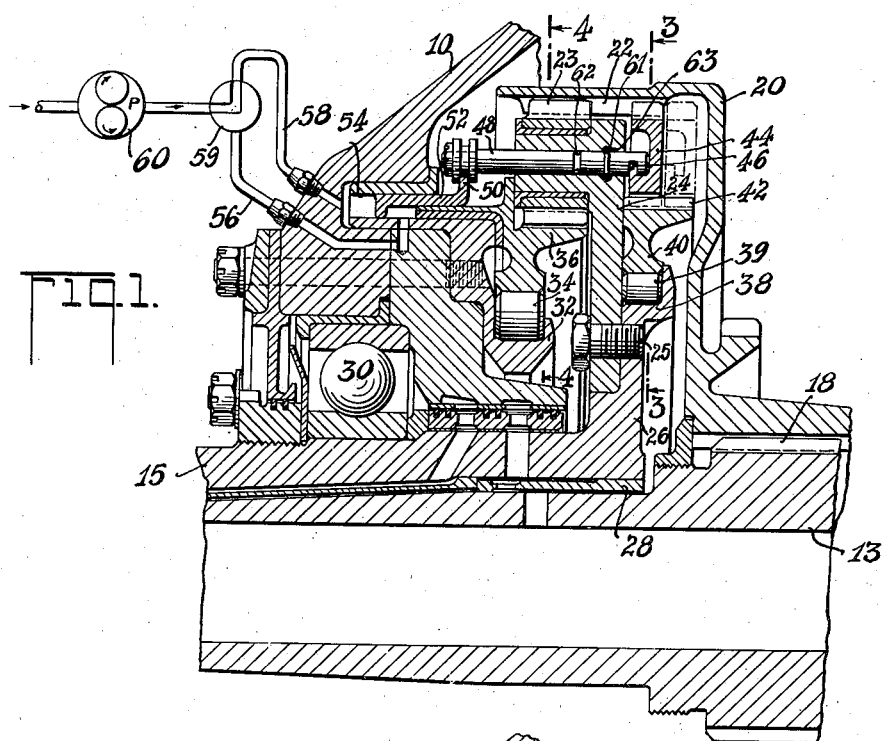
INVENTOR.
WILTON G. LUNDQUIST
BY
ATTORNEY Dec. 17, 1940.  W. G. LUNDQUIST  2,225,121

SELECTIVE SPEED PROPELLER DRIVE FOR AIRCRAFT ENGINES

Filed Aug. 5, 1938   2 Sheets-Sheet 2

INVENTOR
WILTON G. LUNDQUIST
BY
ATTORNEY

Patented Dec. 17, 1940

2,225,121

UNITED STATES PATENT OFFICE 2,225,121

SELECTIVE SPEED PROPELLER DRIVE FOR AIRCRAFT ENGINES

Wilton G. Lundquist, Glen Rock, N. J., assignor to Wright Aeronautical Corporation, a corporation of New York Application August 5, 1938, Serial No. 223,251

21 Claims. (Cl. 74—260)

This invention relates to reduction gears for aircraft engines, a particular object of the invention being to provide a multi-ratio gear by which an aircraft propeller may be driven at reduced speed or in direct drive relative to the engine crankshaft.

The utility of a multi-ratio gear will become apparent from the following outline of engine operation characteristics. For take-off, climb, etc., the engine is operated at maximum power which entails high speed and rich fuel-air ratios, and best propeller efficiency is obtained by using a gear reduction from engine to propeller permitting the latter to turn at around 1500 R. P. M. with a pitch setting appropriate to the absorption of the developed power.

Under cruising conditions, engine power is greatly reduced, and it is conceivable that engine R. P. M. may be cut to the order of 1000 R. P. M. or even less, the engine being operated with high supercharger boost and at high brake mean effective pressure, commonly called B. M. E. P. to attain optimum fuel economy for the power delivered. Propeller efficiency at these low engine speeds, with the gear reduction, may become so low at high flight speeds as to offset the engine efficiency gained. This may be overcome by driving the propeller directly, the pitch of the propeller being adjusted to efficiently absorb the available power.

It will be seen that the change in gear ratio is desired in accordance with engine R. P. M.—that is, with low engine R. P. M., a drive ratio approaching 1:1 is desired, whereas, at high engine R. P. M., a ratio of the order of 2:1 is desired with present full power crankshaft speeds of the order of 2400 R. P. M. As presently conceived, a two-step gear is adequate, since power absorption by the propeller is controllable by propeller pitch adjustment.

Objects of this invention are to provide a multi-ratio propeller reduction gear of simple and sturdy design, to provide a readily operable ratio change which may be utilized with a minimum of time-lag in shifting, to provide means for automatically effecting a ratio change in response to engine R. P. M., and to provide a ratio-shifting clutch of small size which is capable of transmitting large amounts of power, while being readily shiftable at any time. As indicated, the mechanism is adapted for use with aircraft engines equipped with controllable pitch propellers.

Further objects of the invention will become apparent in reading the following detailed description in connection with the drawings in which:

Fig. 1 is a fragmentary longitudinal section through a reduction gear according to the invention;

Fig. 2 is a view, similar to Fig. 1, of an alternative embodiment;

Figure 3:
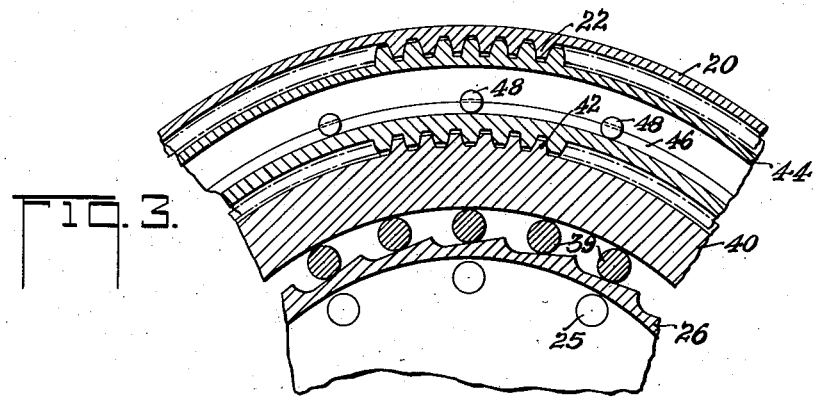
Figure 4:
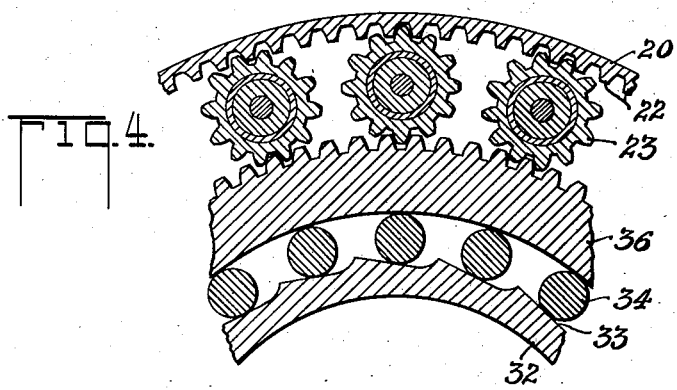
Figure 5:
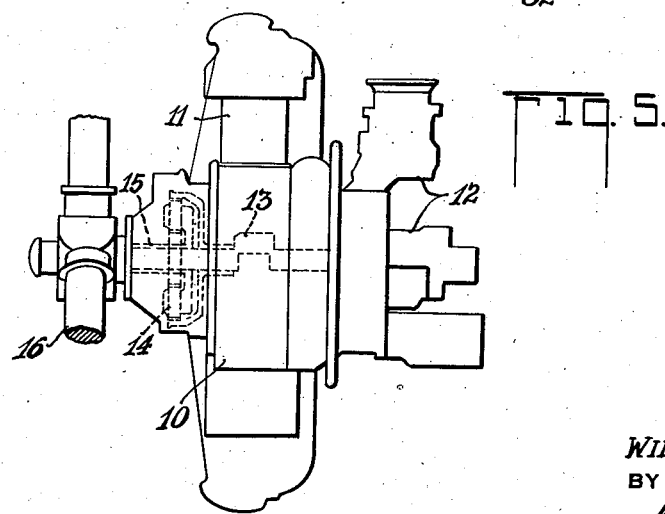

Figs. 3 and 4 are partial sections on the lines 3—3 and 4—4 respectively, of Fig. 1, and Fig. 5 is a diagrammatic elevation of an aircraft power plant with which the invention is adapted for use.

Referring briefly to Fig. 5, an engine crankcase is shown at 10 on which radial cylinders 11 and accessories 12 are mounted, a crankshaft 13 of the engine connecting with a reduction gear 14 upon the shaft 15 on which a controllable pitch propeller 16 is mounted. This arrangement is conventional but is shown to indicate the relationship of the specific gears of Figs. 1-4 thereto.

Referring to Figs. 1, 3 and 4, it will be seen that the crankshaft 13 has splined thereto, at 18, a bell gear 20 having elongated internal teeth 22, the forward part of the teeth meshing with pinions 23 mounted on a pinion carrier 24 bolted at 25 to a flange 26 on the rear end of the propeller shaft 15. The latter is piloted at 28 on the crankshaft 13, and is carried in a ball bearing 30 in the nose of the crankcase. The case carries a fixed extension 32 having a serrated race 33 forming the inner track for rollers 34 carrying a sun gear 36 meshing with the pinions 23, the elements 33, 34, 36 comprising a one-way roller brake. The outer periphery of the flange 26 is formed as a serrated inner race 38 on which rollers 39 rest, the latter being embraced by a ring 40 having its outer periphery formed with teeth 42. The elements 38, 39, 40 comprise a one-way roller clutch opposite in driving sense to the roller brake, as will be apparent from Figs. 3 and 4.

A ring 44 has internal and external teeth engageable with the teeth 42 and 22, the ring being axially movable, having its inner teeth constantly engaging the teeth 42, and having its outer teeth either engaging or out of engagement with the teeth 22 according to its axial position.

Means for axially shifting the ring 44 comprise an annular rib 46 engaged by grooved rods 48 slidable through the journals of the pinions 23, the leftward ends of the rods being grooved and engaging a rim 50 on an annular piston 52 axially movable in an annular cylinder 54 in the crankcase 10. Fluid passages 56, 58, communicate with opposite ends of the cylinder 54 at opposite sides of the head of the piston 52, the passages connecting through a selector valve 59 to a source of fluid pressure shown as a pump 60. Thus, with fluid pressure available, turning the valve 59 to open the passages 56 or 58 thereto effects the axial shift of the ring 44. Preferably valve operation will be controlled by a crankshaft speed responsive device such as a flyball governor, but it may be manually selective. In this shifting arrangement, oil pressure is needed only to effect the shift, the gear remaining in shifted position without need of further oil pressure. A spring ring 61 serves as a detent, engaging grooves 62 or 63 in the rods 48.

When the ring 44 engages the bell gear and the ring 40, the transmission is set for direct drive from the crankshaft through the rollers 39 to the propeller shaft. The sun gear 36 overruns member 32 through the action of the associated roller brake. To shift to a reduction drive, the engine power is briefly reduced to relieve driving pressure on the ring 44, whereupon the ring 40 overruns the flange 38 and the ring 44 is moved out of mesh with the ring gear teeth 22. Engine power is then increased, the drive being afforded to the shaft 15 through the reduction gear, the overrunning brake 32, 34, 36 taking up the reaction imposed on the sun gear 36. Return to direct drive is similarly made, by cutting engine power, shifting the clutch ring 44 and increasing engine power.

The arrangement of Fig. 2 shows a similar form of reduction gear to that described except that the positive clutch ring 44 and the rollers 39 are replaced with a multi-disc friction clutch comprising exteriorly notched discs 66 slidably engaged on the ring gear teeth 22, alternating with interiorly notched discs 68 slidably engaged on splines 70 formed on an extension 72 of the propeller shaft flange 26, the extension including an outer abutment 73 against which the clutch discs may press. The carrier 24 is formed with an annular cylinder 74 in which an annular piston 75 is movable to bear upon the clutch discs.

Automatic speed responsive means are provided to valve pressure engine oil to the cylinder 74 to effect clutch engagement for direct drive; when oil pressure is cut off, normal leakage at the cylinder and other connections allows clutch disengagement whereupon the drive drops back upon the reduction gear as previously described.

The oil valving arrangement comprises a valve sleeve 78 axially movable on the right end of the propeller shaft, the sleeve carrying a conical apron 79 inclined toward the face of the web of the ring gear 20, the latter having an annular rib 80, a row of balls 82 being disposed between the apron and web. In slow speed operation, a spring 83 holds the sleeve toward the web, but when rotating at high speed, the balls 82 fly outwardly due to centrifugal force, camming on the conical apron and shifting the sleeve leftwardly. The rib 80 serves to establish, along with the initial compression of the spring 83, the R. P. M. of the shaft 13 at which sleeve shifting will occur. Movement of the sleeve leftwardly serves to cover oil ports 85, 86, the former leading to the cylinder 74 through passages 87, 88, and the latter leading to the oil pressure supply through passages 89, 90, 91, and 92 through a transfer bearing 93. Thus at high crankshaft speed, the clutch 66, 68 is disengaged, while at low crankshaft speed, oil passes to the cylinder 74 for clutch engagement and direct drive.

A simple form of automatic valve is shown and described, but any other suitable form of speed responsive means for clutch control may be substituted therefor, or may be used in connection with the embodiment of Fig. 1.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What I claim is:

1. A multi-speed drive assembly comprising a support having a power shaft having a bell gear journalled therein, a driven shaft including a spider having pinions journalled thereon meshing with the bell gear, a clutch engageable between the spider and bell gear to effect unitary rotation thereof, means responsive to low and high rotational speed of said power shaft to respectively effect engagement and disengagement of said clutch, a sun gear engaging said pinions and a one-way brake between said sun gear and support.

2. A multi-speed drive assembly comprising a support having a power shaft having a bell gear journalled therein, a driven shaft including a spider having pinions journalled thereon meshing with the bell gear, a clutch engageable between the spider and bell gear to effect unitary rotation thereof, hydraulic mechanism for shifting said clutch, a valve adjustable to admit or close off hydraulic fluid from said mechanism, means responsive to power shaft rotational speed to actuate said valve, a sun gear engaging said pinions and a one-way brake between said support and sun gear.

3. In a multi-speed drive assembly, a driving shaft, a driven shaft, means to clutch the driven shaft to the driving shaft for direct drive therewith, means to drive the driven shaft at reduced speed ratio relative to the driving shaft, and means responsive to high rotational speed of the driving shaft for shifting to reduced speed drive between said shafts.

4. In a multi-speed drive assembly, a driving shaft, a driven shaft, means to clutch the driven shaft for unitary rotation with the driving shaft, means to drive the driven shaft at reduced speed ratio relative to the driving shaft, and means responsive to the rotational speed of the driving shaft for shifting from and to direct drive and reduced speed drive between said shafts, said means comprising an axially movable shifting device rotatable with the driving shaft and having a conical apron thereon, an abutment on the driving shaft, and elements radially displaceable by centrifugal force between said apron and abutment, said elements upon radially outward movement, bearing upon said apron and moving same axially.

5. A multi-speed drive assembly comprising a power shaft having a bell gear, a housing within which the shaft is journalled, a driven shaft coaxial with the power shaft having a planet carrier and planet pinions engaging the bell gear, means for selectively clutching said planet carrier to said bell gear, a sun gear engaged with the carrier pinions, coaxial with said shafts, a one-way brake between said sun gear and said housing, said sun gear, by means of said brake, being non-rotatable relative to the housing in one direction and being freely rotatable in the other direction, and an overrunning clutch between said selective clutch and the planet carrier to divorce said selective clutch for free shifting, upon overrun of the driven shaft.

6. A multi-speed drive assembly comprising a power shaft having a bell gear, a housing within which the shaft is journalled, a driven shaft coaxial with the power shaft having a planet carrier and planet pinions engaging the bell gear, means for selectively clutching said planet carrier to said bell gear, a sun gear engaged with the carrier pinions, coaxial with said shafts, a one-way brake between said sun gear and said housing, said sun gear, by means of said brake being non-rotatable relative to the housing in one direction and being freely rotatable in the other direction, and means controlled by high and low speed of the power shaft for respectively disengaging and engaging said selective clutch.

7. A multi-speed drive assembly comprising a power shaft having an internal gear, a coaxial driven shaft having a planet carrier including planet pinions engaging said internal gear, a support, a sun gear journalled on said support and engaging said planet pinions, a one-way brake connecting the sun gear and support, and means comprising a positive dog clutch and an overrunning clutch in series therewith for selectively locking the carrier and internal gear for unitary rotation in one direction.

8. A multi-speed drive assembly comprising a power shaft having an internal gear including elongated teeth, a driven shaft including a planet carrier having planet pinions engaged with a portion of said internal gear teeth, selectively operable clutch means engaging another portion of said teeth for connecting said carrier and internal gear for unitary rotation, a housing, and a sun gear journalled thereon and having a one-way brake connection between the sun gear and housing.

9. A multi-speed drive assembly comprising a power shaft having an internal gear, a driven shaft including a planet carrier having planet pinions engaging said internal gear teeth along part of the length thereof, a reaction sun gear engaging said pinions, and clutch means carried by the planet carrier engageable with said internal gear teeth along another part of the length thereof, for clutching the planet carrier and the internal gear together for unitary rotation.

10. A multi-speed drive assembly comprising a power shaft having an internal gear, a driven shaft including a planet carrier having planet pinions engaging said internal gear teeth along part of the length thereof, a reaction sun gear engaging said pinions, and clutch means carried by the planet carrier engageable with said internal gear teeth along another part of the length thereof, for clutching the planet carrier and the internal gear together for unitary rotation, said clutch comprising an axially shiftable piston member, a cylinder member embracing the piston and a hydraulic pressure system for admitting fluid to the cylinder for effecting said axial shift.

11. A multi-speed drive assembly comprising a power shaft having an internal gear, a driven shaft including a planet carrier having planet pinions engaging said internal gear teeth along part of the length thereof, a reaction sun gear engaging said pinions, and clutch means carried by the planet carrier engageable with said internal gear teeth along another part of the length thereof, for clutching the planet carrier and the internal gear together for unitary rotation, said clutch comprising an axially shiftable piston member, a cylinder member embracing the piston, and power shaft speed responsive means controlling fluid flow of fluid under pressure to the cylinder to effect said axial shift.

12. In aircraft, a power plant operable at varying power output and R. P. M., the power available generally increasing with the R. P. M., a propeller, a multi-speed transmission drivably connecting the power plant and propeller, and means responsive to decrease in engine speed for shifting the change speed gear to ratio wherein the rotational speed of the propeller is more nearly that of the power plant.

13. In aircraft, a power plant operable at varying power outputs, having a power shaft which increases in R. P. M. with increasing power, a controllable pitch propeller, a multi-speed transmission connecting the power shaft and propeller, and means responsive to power shaft speed changes to shift the transmission ratio.

14. In aircraft, a power plant operable at varying power outputs, having a power shaft which increases in R. P. M. with increasing power, a controllable pitch propeller, a multi-speed transmission connecting the power shaft and propeller, and means responsive to power shaft speed changes to shift the transmission ratio, said means operating in such sense that the propeller is operated at progressively closer R. P. M. to power shaft R. P. M. as the speed of the latter is decreased.

15. In aircraft, in combination, a controllable pitch propeller, an engine, a two ratio gear drivably connecting the engine and propeller, and means to shift said gear between high and low ratio in response to engine R. P. M., the changes in engine R. P. M. necessary to effect said gear shift being accomplished by variation in the pitch setting of said propeller.

16. In aircraft, an engine driving a controllable pitch propeller, pitch decrease and increase thereof respectively causing increase and decrease in engine R. P. M., a transmission having high and low ratios drivably connecting said engine and propeller, and means responsive to low engine R. P. M. for shifting the transmission into high ratio, and responsive to high engine R. P. M. for shifting the transmission into low ratio.

17. In aircraft, an engine driving a controllable pitch propeller, pitch decrease and increase thereof respectively causing increase and decrease in engine R. P. M., a transmission having direct drive and reduction drive ratios connecting the engine and propeller, and means to shift the transmission into direct drive ratio in response to low engine R. P. M. and into reduction drive ratio in response to high engine R. P. M.

18. In aircraft, an engine driving a controllable pitch propeller, pitch decrease and increase thereof respectively causing increase and decrease in engine R. P. M., a transmission having direct drive and reduction drive ratios connecting the engine and propeller, and means to shift the transmission into direct drive ratio in response to low engine R. P. M. and into reduction drive ratio in response to high engine R. P. M., said engine, transmission and engine R. P. M. responsive means comprising a unitary structural assembly.

19. In a multi-speed drive assembly, a driving shaft, a driven shaft, means to clutch the driven shaft to the driving shaft for direct drive therewith, means to drive the driven shaft at reduced speed ratio relative to the driving shaft, and means responsive to low rotational speed of the driving shaft for shifting to direct drive between said shafts.

20. In a multi-speed drive assembly, a driving shaft, a driven shaft, means to clutch the driven shaft to the driving shaft for direct drive therewith, means to drive the driven shaft at reduced speed ratio relative to the driving shaft, and means responsive to high and low rotational speed of the driving shaft for shifting respectively to reduced speed drive and direct drive between said shafts.

21. In combination, an engine driving a variable driven load, variation in the driven load causing increase or decrease in rotational speed of the engine, a transmission having high and low ratios drivably connecting said engine and load, and means responsive to low engine R. P. M. for shifting to the high ratio and responsive to high engine R. P. M. for shifting to the low ratio.

WILTON G. LUNDQUIST.